United States Patent [19]

Klees

[11] Patent Number: 5,034,990

[45] Date of Patent: Jul. 23, 1991

[54] EDGE ENHANCEMENT ERROR DIFFUSION THRESHOLDING FOR DOCUMENT IMAGES

[75] Inventor: Kevin J. Klees, Rochester, N.Y.

[73] Assignee: Eastman Kodak Company, Rochester, N.Y.

[21] Appl. No.: 520,587

[22] Filed: May 8, 1990

Related U.S. Application Data

[63] Continuation of Ser. No. 402,581, Sep. 5, 1989, abandoned.

[51] Int. Cl.⁵ .............................................. G06K 9/00
[52] U.S. Cl. ...................................... 382/22; 382/50; 382/54; 358/447; 358/462; 358/464; 358/465
[58] Field of Search ............................ 382/50, 54, 22; 358/447, 462, 464, 465

[56] References Cited

U.S. PATENT DOCUMENTS 4,577,235 3/1986 Kannapell et al. .................. 358/280
4,878,125 10/1989 Katayama et al. .................. 358/443

Primary Examiner—David K. Moore
Assistant Examiner—Daniel Santos
Attorney, Agent, or Firm—Dennis R. Arndt

[57] ABSTRACT

Apparatus for converting multilevel video images into a bilevel image having an accurate rendition of the original grayscale of the image. The apparatus performs enhanced preservation of edge information in the image when using error diffusion techniques.

6 Claims, 6 Drawing Sheets

EDGE ENHANCEMENT ERROR DIFFUSION THRESHOLDING FOR DOCUMENT IMAGES

This is a continuation of Ser. No. 07/402,581, filed Sept. 5, 1989 now abandoned.

TECHNICAL FIELD

The present invention relates to a method and apparatus for processing video images to reproduce them in bi-level picture elements. Error diffusion techniques are used that preserve edge detail while converting multi-level video images into bilevel images which present an accurate rendition of the original grayscale.

BACKGROUND ART

Many electronic systems to manipulate images in digital form use techniques to convert images with multiple gray levels into images with only two gray levels (bilevel). A simple method to accomplish this conversion is to compare the multi-level input against a fixed threshold value. If the input is greater than the threshold, the output is set to the maximum output level. In the other case, the output is set to the minimum level. In this simple algorithm, the difference between the input level and the output level is ignored.

A more advanced technique known as error-diffusion makes use of this ignored difference to create a more accurate bilevel rendition of the input gray levels. This is accomplished by spatially modulating pixels in the output image. The percentage of pixels set to maximum levels in an area of the output image will represent the gray level of the input image. This technique trades off the spatial resolution of the output system for the gray level resolution of the input system. One of the original papers discussing error diffusion by Robert Floyd and Louis Steinberg, entitled "4.3: An Adaptive Algorithm for Spatial Grey Scale", Stanford University, Stanford, Calif.; SID 75 Digest, pp. 36-37, describes the use of this algorithm. An input pixel with gray levels is compared against a threshold, and set to either full brightness, or no brightness (on/off). After this decision, an error is calculated between the new level of the pixel and the original level of the pixel. This error is then "diffused" to surrounding pixels before they are compared with a predetermined threshold. The error is diffused to, and summed with an unprocessed pixel, and the pixel is later thresholded, generating yet another error. Thus, any one pixel in the image may be effected by errors from many previous pixels before being processed. Using current error diffusion techniques, this error is calculated by a simple linear subtraction of the two levels of the pixel.

Typically a percentage of the error signal is diffused to each of 4 pixels that have not been thresholded yet. These might be a pixel adjacent to the pixel being thresholded, and three pixels on the next line of the image. A set of percentages for the error distribution could be referred to as an "error kernel", and typically would add up to 100%. An example of such a set would be:

```
...X X X X X X X X X X X     A = 5/16
   X X X X X X X X X X X     B = 1/16
   X X X X P A 0 0 0 0 0     C = 7/16
   0 0 0 D C B 0 0 0 0 0     D = 3/16
```

-continued
```
0 0 0 0 0 0 0 0 0 0 0...
``` where P is the pixel being processed, and the ratios define the percentage of error diffused to each of the surrounding pixels. Note that pixels on previous lines receive no portion of the error since they have already been converted to bilevel pixels. At each of the locations receiving the error, it is summed with the pixel, and a range check operation is performed to keep the data in range.

U.S. Pat. No. 4,449,150, filed Dec. 29, 1981 and issued on May 15, 1984, in the name of Kato, is directed to a modification of the error diffusion technique. This modification is intended to remove an artifact that is associated with the algorithm. Certain values of inputs will produce noticeable artifacts in the form of patterns and streaks in the output image. Kato solved this by randomizing the threshold used in the original algorithm.

DISCLOSURE OF THE INVENTION

In accordance with the present invention, the strength of the error signal is modulated by edge information in the image. An operator selection means is provided for allowing different amounts of edge signal modulation based on different classes of image. An additional discrimination method modifies the edge signal modulation based on different image classes. By delineating these two types of image structure, it is possible to boost the edge information in the text areas while not enhancing edges in continuous tone areas of the image. This adaptation makes the error diffusion algorithm more applicable to images that contain a mix of continuous tone and text, and results in better rendition of edges in documents without the need for a separate edge enhancement process. In the past, the error signal has been calculated as a simple subtraction of the pixel values before and after thresholding. In the present invention, the error is generated by a lookup table. This lookup table has several sections, each of which will generate an error signal of different strength. That is to say, the error is multiplied by different gain factors. An edge signal calculated from image data is used to select the appropriate section of the lookup table to be used.

The determination of the gain factors to be applied is an empirical task requiring many iterations. The operator selection means is used to preload different predetermined gain selections before each image is processed by this invention.

An electronic imaging system with 8 digital bits allocated to represent the gray level of a pixel would allow a range of 0-255 as valid pixel values. If an input value of 200 is compared to a threshold of 127, the result is an output of 255. In the prior art this would produce an error of minus fifty five (−55). If a small edge signal was present at that point in the image, this error signal may be diffused unchanged from this value. However, if a large edge signal is present, the error could be reduced by ½ so that less diffusion would take place, and a sharper edge would result.

An edge signal represents the derivative of the image signal at one point in the image space. Several different functions could be used to generate this signal; one would be to subtract the value of the previous pixel on a line from the pixel being processed. This signal would only contain information about vertical edges in the image. It would be preferable to have the edge signal contain information about both vertical and horizontal edges in the image. This can be accomplished by subtracting the pixel above the processed pixel from the pixel preceding the processed pixel.

By calculating the difference between pixel values from different lines and columns of the image; information about horizontal and vertical edges is generated. Also, more complex functions could be used to generate the edge signal; i.e., such a function would use a 3×3 pixel neighborhood around the pixel being processed.

Whichever function is used to generate the edge signal, it will provide at least as many bits as there are in the original image information, in this case 8 bits. However, it is possible to discard some of these bits to reduce the amount of circuitry needed for further processing of the signal. This invention makes use of the 5 most significant bits out of the 8 generated. Using 5 bits allows the selection of 32 different error signal gain factors.

MODES OF CARRYING OUT THE INVENTION

Figure 1:
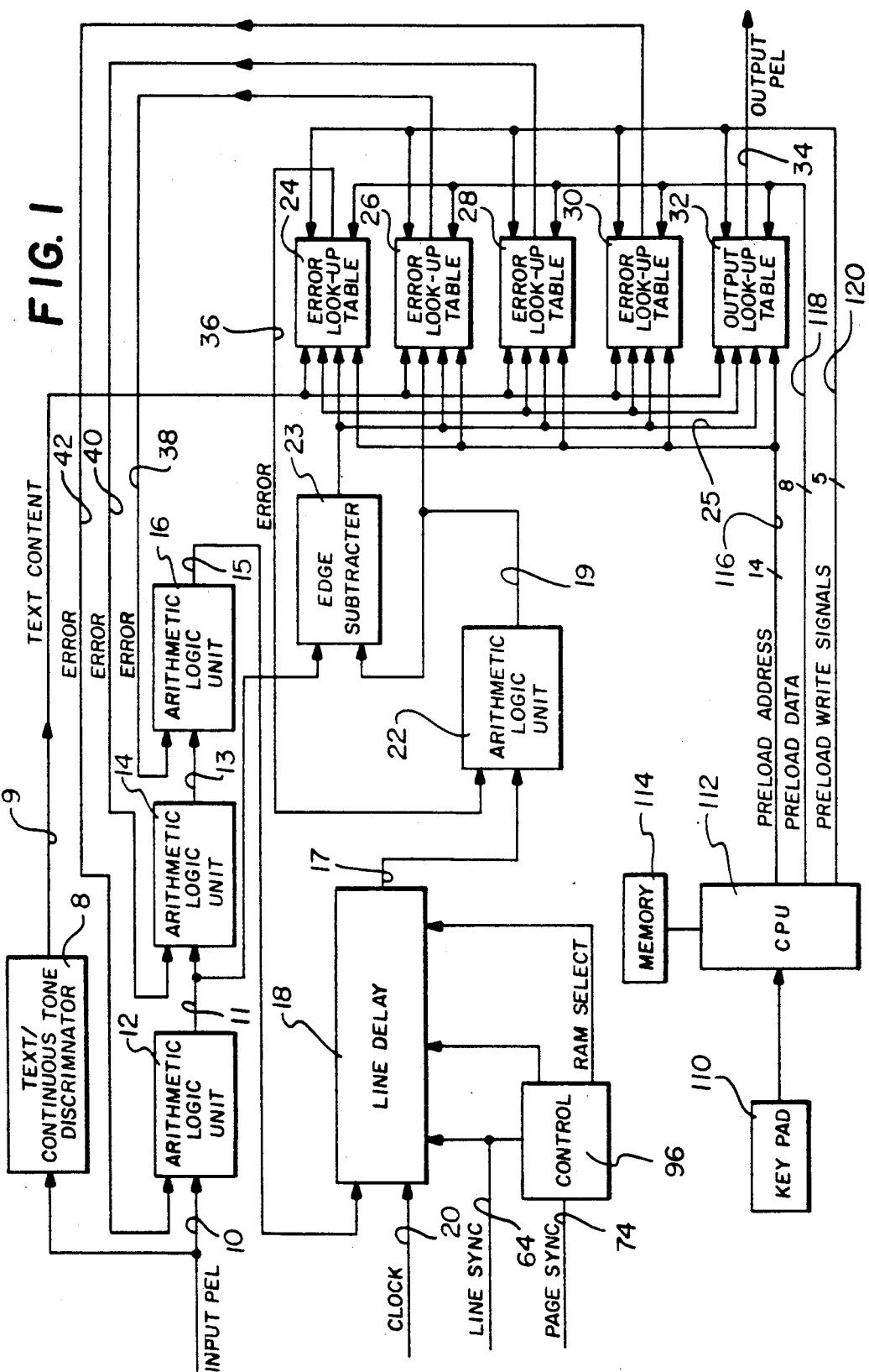
FIG. 1 shows in block diagram form the apparatus according to the present invention.

The invention will be described with reference to the accompanying drawings. FIG. 1 is a block diagram of a circuit that performs edge enhanced error diffusion processing on a digital video image. Image pixels are input on line 10 to three arithmetic logic units (ALU) 12, 14, and 16. The ALU's take each pixel that is serially inputted and either adds or subtracts an error signal that is fed back from pixels that are further downstream and are currently being processed. The pixel data that generates the error signals has already passed through the ALU's as well as a line delay 18 (to be discussed later).

Incoming pixels are latched into the first ALU 12 along with the current error data. This error data is then either added or subtracted (depending on the sign of the error data). The result of this calculation is also checked internally within the ALU to be sure that the result is within the appropriate range. This data is then latched into ALU 14 on the leading edge of the next clock signal on line 20, and the new error data is added. After three ALU's 12, 14 and 16 have operated on the input pixel data, it is then delayed by one vertical line thru the use of a line delay 18. Line delay 18 functions to delay each pixel by the length of the line minus three pixels.

The output of line delay 18 is then passed to a fourth ALU 22 and has a further error signal either added to or subtracted from it. The value of the pixel output by ALU 22 is then sent to four error lookup tables 24, 26, 28 and 30 and an output lookup table 32 via line 19. This pixel data on line 19 is also fed to the edge signal subtracter circuitry 23 (to be discussed later). The edge signal produced by edge subtracter 23 on line 25 is also fed to the error signal lookup tables 24, 26, 28 and 30, as well as to the output lookup table 32.

A keypad 110 is used by an operator to select the type of image to be processed. A central processing microcomputer 112 intercepts this user input. When a type of image has been selected, the CPU 112 verifies and interprets the selection and then preloads error lookup tables 24, 26, 28, and 30 and also the output lookup table 34 with the appropriate predefined data from CPU memory 114. This data is preloaded via a preload address on line 116 and preload data on line 118. Write signals to load the lookup tables are passed from the CPU 112 to the lookup tables 24, 26, 28, 30 and 34 via 5 preload write signals on line 120.

The input image pixel data on line 10 is also applied to the text/continuous tone discriminator 8. One way for implementing the discriminator function is described in U.S. Pat. No. 4,577,235. An output signal from discriminator 8 indicating text content in the area of the image being processed is outputted on line 9. This text content signal is passed to error lookup tables 24, 26, 28 and 30 and also to output lookup table 34 via line 9. When the signal on line 9 is active (high) this is an indication of text content in the area of the image. Conversely, when the signal on line 9 is low, continuous tone image data is present.

Output lookup table 32 uses the final pixel result on line 19 and the edge signal on line 25 to produce the output pixel data on line 34. The resultant output pixel data on line 34 is produced by a comparison of the pixel data on line 19 with a predetermined threshold or level. Such an output signal may be as simple as using the most significant bit of the pixel data being processed. On the other hand, a 2 bit or 4 bit output signal can be generated if appropriate for a given application.

Edge subtracter circuit 23 produces the edge signal on line 25 by subtracting the resultant pixel data on line 19 from the pixel data produced by ALU 12, on line 11. The 5 most significant bits of this edge signal are fed to the four error lookup tables 24, 26, 28 and 30.

Four error lookup tables 24, 26, 28, and 30 receive the same 8 bit pixel data and 5 bit edge data appearing at their inputs and generate 8 bits of error signal data. These 8 bit error signals generated by lookup tables 24, 26, 28 and 30 are fed back to ALU's 22, 16, 14 and 12 via feedback lines 36, 38, 40 and 42, respectively. The generation of the error signal is performed by using the known function in the output lookup table and the input pixel value along with the edge signal. The edge signal acts to select from one of 32 empirically determined possible error signal functions.

It should be noted that the lookup functions loaded into the five tables are interdependent. That is to say, that the value at a particular address in one lookup table depends on the value placed at the same address in the other four lookup tables. For example, if the weighting of one of the error signals is reduced, the three other error weights would have to be increased to achieve the original total error.

Accordingly, it can be seen that the present invention does not provide a simple error diffusion technique but instead generates the error signals and output signal with the additional use of edge information in the image.

All four of the ALU's in FIG. 1 are identical and are merely replicated in four places. There are basically three inputs to each ALU, namely the clock signal, the error data, and the pixel data. For example, ALU 14 has as its inputs the error signal on line 40, the clock on line 20, and the output of ALU 12 on line 11.

Figure 2:
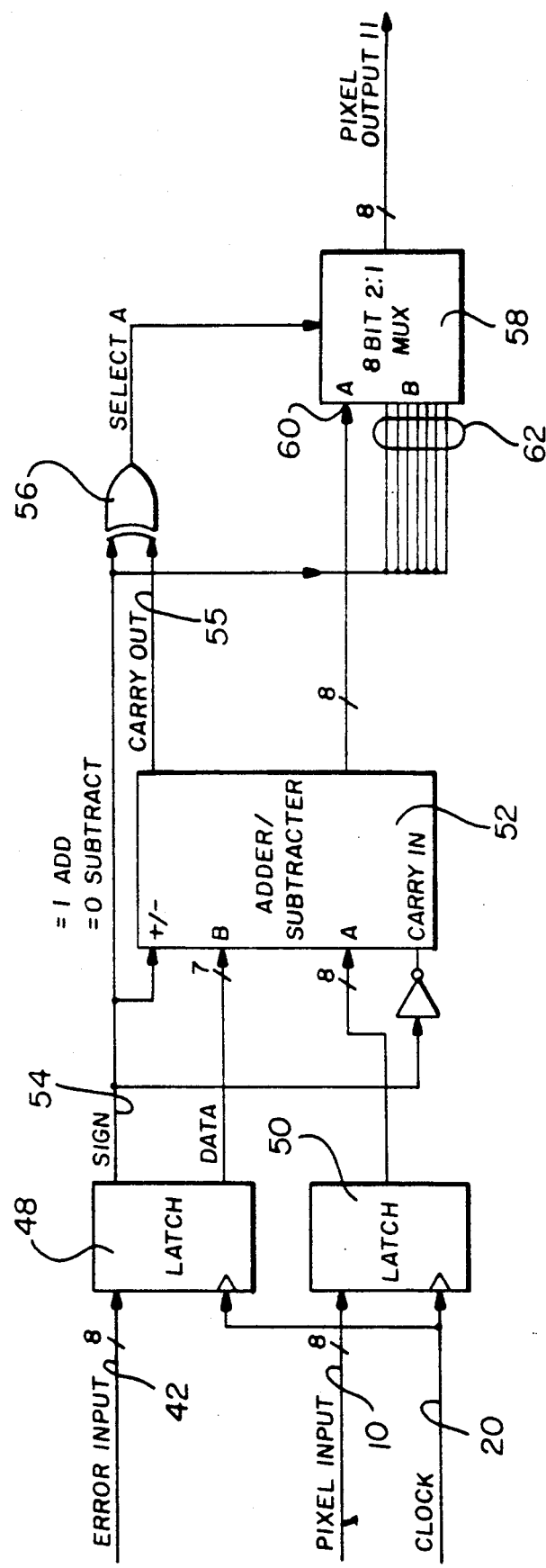
FIG. 2 shows a block diagram of an arithmetic logic unit shown in FIG. 1.

FIG. 2 illustrates in a more detailed block diagram the implementation of ALU 12 shown in FIG. 1. There are three inputs to the ALU. The first input is an 8 bit error signal on line 42, having a sign bit with the remaining seven bits being used to indicate its level. The second input on line 10 is the input pixel data which is an 8 bit unsigned signal. On the leading edge of the clock signal which is the third input on line 20, both the error and pixel data entering on line 42 and 10 respectively are stored in respective latches 48 and 50. The error signal is an 8 bit signal and has a single bit indicating whether it is positive or negative with the remaining seven bits indicating the level. This error signal is generated by an appropriate error lookup table, the output of which is input to a corresponding ALU. The pixel data is an unsigned 8 bit signal indicating the level of that particular pixel.

The error signal and the pixel data are then fed to an adder subtracter circuit 52 which takes the two signals and either adds or subtracts them based on the sign of the error signal on line 54. By comparing the carry out signal on line 55 of adder subtracter circuit 52 with the sign of the error signal on line 54, a determination can be made as to whether or not the unsigned 8 bit result on line 60 is within the 0–255 range. In the case of addition, the carry in bit is set to zero, and a carry out bit equal to one indicates that the result exceeds 255. A complementary set of levels for subtraction will indicate a result less than zero. For example, if addition is performed and the result exceeds 255, the signal must be reduced or clipped to 255. If on the other hand, a subtraction were performed, and the signal is less than zero, it must be clipped to zero. An exclusive-OR gate 56 is used to make this determination, and is used to control the output of an 8 bit 2:1 multiplexer 58.

For example, when an addition operation is performed by the adder 52 and the result is within the range, the sign bit is a 1, and the carry out bit is a zero. Thus, the output of the exclusive OR gate 56 is a 1, resulting in the selection of input A shown at 60 as a result of the calculation. On the other hand, if the result of an addition operation is out of the range, the sign bit remains one, and the carry out bit is also a one. This results in 2:1 multiplexer 58 selecting input B shown at 62, which is connected to the sign bit on line 54. In this case, the sign bit is a one and therefore, the output of multiplexer 58 will be an 8 bit unsigned number with all the bits set to 1's, resulting in a pixel value equal to 255. In a like manner, this circuit will also clip subtraction results to zero when the calculated value is less than zero.

Figure 3:
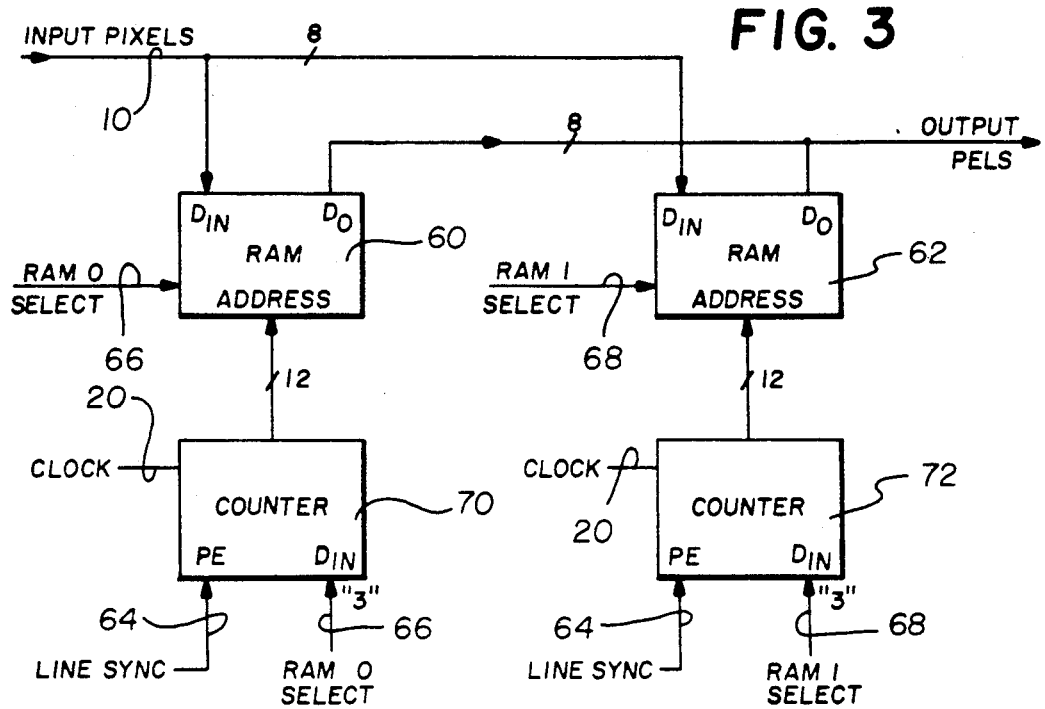
FIG. 3 shows in greater detail the line delay circuit illustrated in FIG. 1.

FIG. 3 illustrates in greater detail line delay 18 shown in FIG. 1. Two static random access memories (RAM) 60 and 62 are used. The size of these memories is determined by the maximum line size to be processed by the circuit. In this instance, 12 address bits are used for a maximum line size of 4096 pixels. For every other image line RAM 60 receives data while RAM 62 outputs data previously written into it. This order is reversed for the intermediate lines. A one bit counter that is clocked by a line sync signal on line 64 is used to generate the RAM 0 and RAM 1 select signals on lines 66 and 68 respectively, which are complementary.

Identical 12 bit counters 70 and 72 are used to generate address data for the RAM 60 and RAM 62, respectively. Each counter 70 and 72 is clocked by the clock on line 20. An input line sync signal on line 64 is used to preload counters 70 and 72 with a number at the beginning of each scan line. The purpose of this preloaded data is to make this circuit delay the pixel input by the number of pixels in a scan line less three. This is required to synchronize the pixel data in the ALU's before and after line delay 18. When scan line data is written to RAM 60, counter 70 is preloaded with zero, and when scan line data is read from RAM 62, counter 72 is preloaded with the value "3". This results in data being read three pixels later than when the data was written into line delay 18. The value 3 can be preloaded by connecting the two lowest bits of the data input line of counter 70 to the RAM 0 select line 66, and connecting all other data inputs to a zero.

Figure 4:
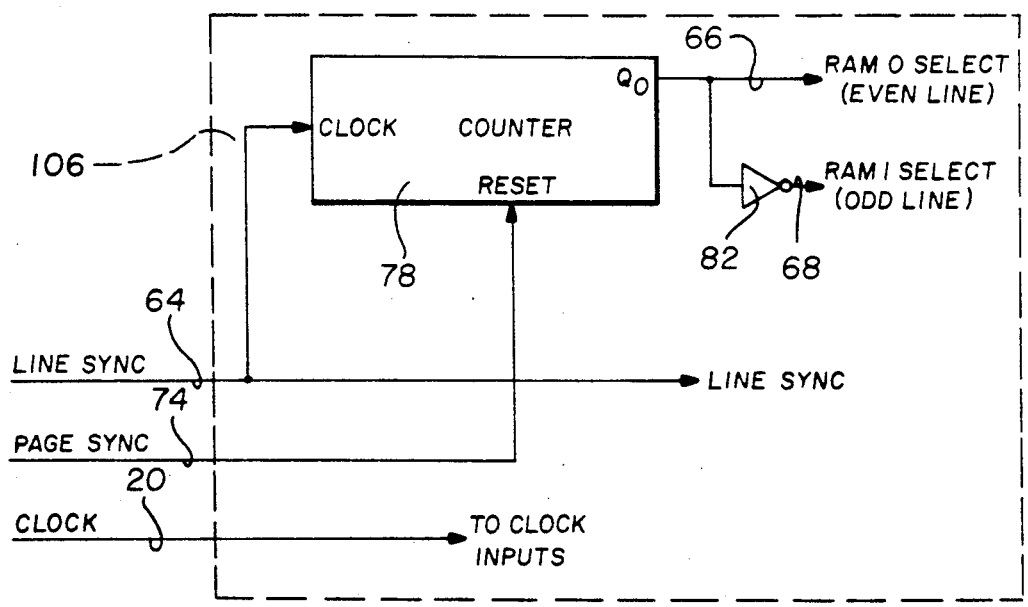
FIG. 4 shows in greater detail the circuitry for generating select signals shown in FIG. 3.

FIG. 4 illustrates the control circuitry 106 used to generate the RAM 0 and RAM 1 select signals used in FIG. 3.

This control circuit 106 uses the line sync signal on line 64 and page sync signal on line 74 to generate complementary output signals for RAM 0 select (even line) and RAM 1 select (odd line), on lines 66 and 68 respectively. The clock signal appears on line 20 and is used to clock all inputs. The circuit uses a one bit line counter 78, which generates complementary even line and odd line signals, which are used to select the two RAM's 60 and 62 in line delay circuit 18 of FIG. 3. Counter 78 counts the line number of each scan line.

As a result, the least significant bit of counter 78 toggles at the beginning of each successively occurring scan line. The output of counter 78 bit Q0 on line 66 is applied as the RAM 0 (even line) select signal and through inverter 82, as the RAM 1 (odd line) select signal. Counter 78 is reset at the beginning of each incoming image by the page sync signal appearing on input lead 74. The line sync signal appearing on input lead 64 provides the pre-set enable signal at the beginning of each scan line.

Figure 5:
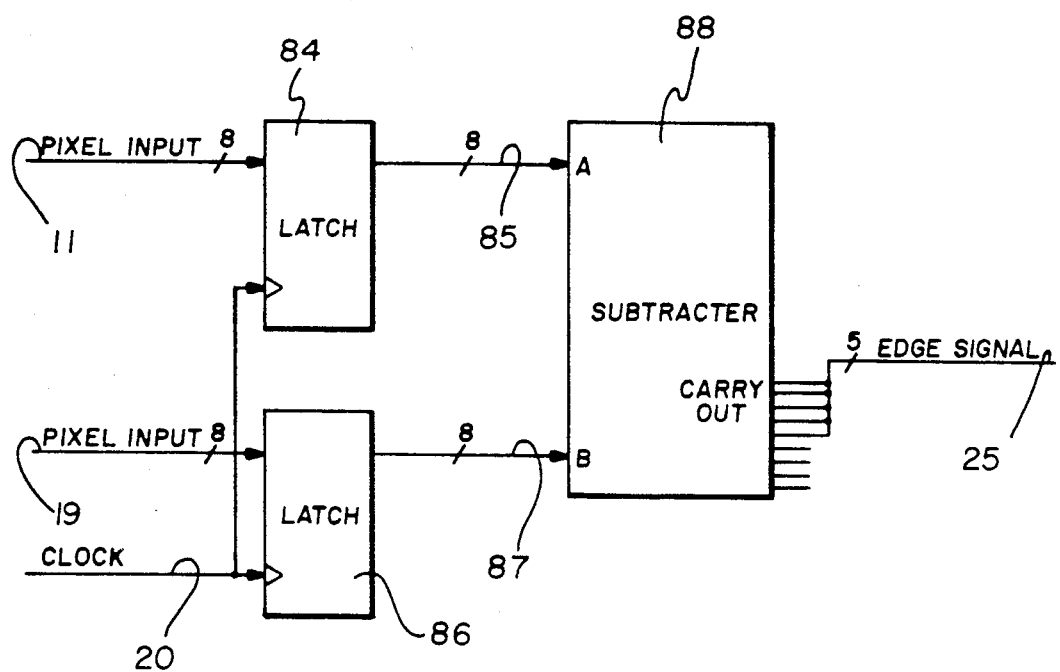
FIG. 5 shows in greater detail the edge subtracter circuit illustrated in FIG. 1.

FIG. 5 illustrates in greater detail the edge signal subtracter 23 shown in FIG. 1.

Pixel data from ALU 12 on line 11, and from ALU 22 on line 19 is stored in latches 84 and 86 respectively. A 9 bit signed result is produced on line 25 by 8 bit binary subtracter 88.

The most significant bit of the 9 bit signal on line 25 is a carry output. The five most significant bits of this signal are passed to error lookup table 24, 26, 28, 30 and output lookup table 32 on line 25. The four least significant bits of subtracter circuit 88 are discarded.

Figure 6:
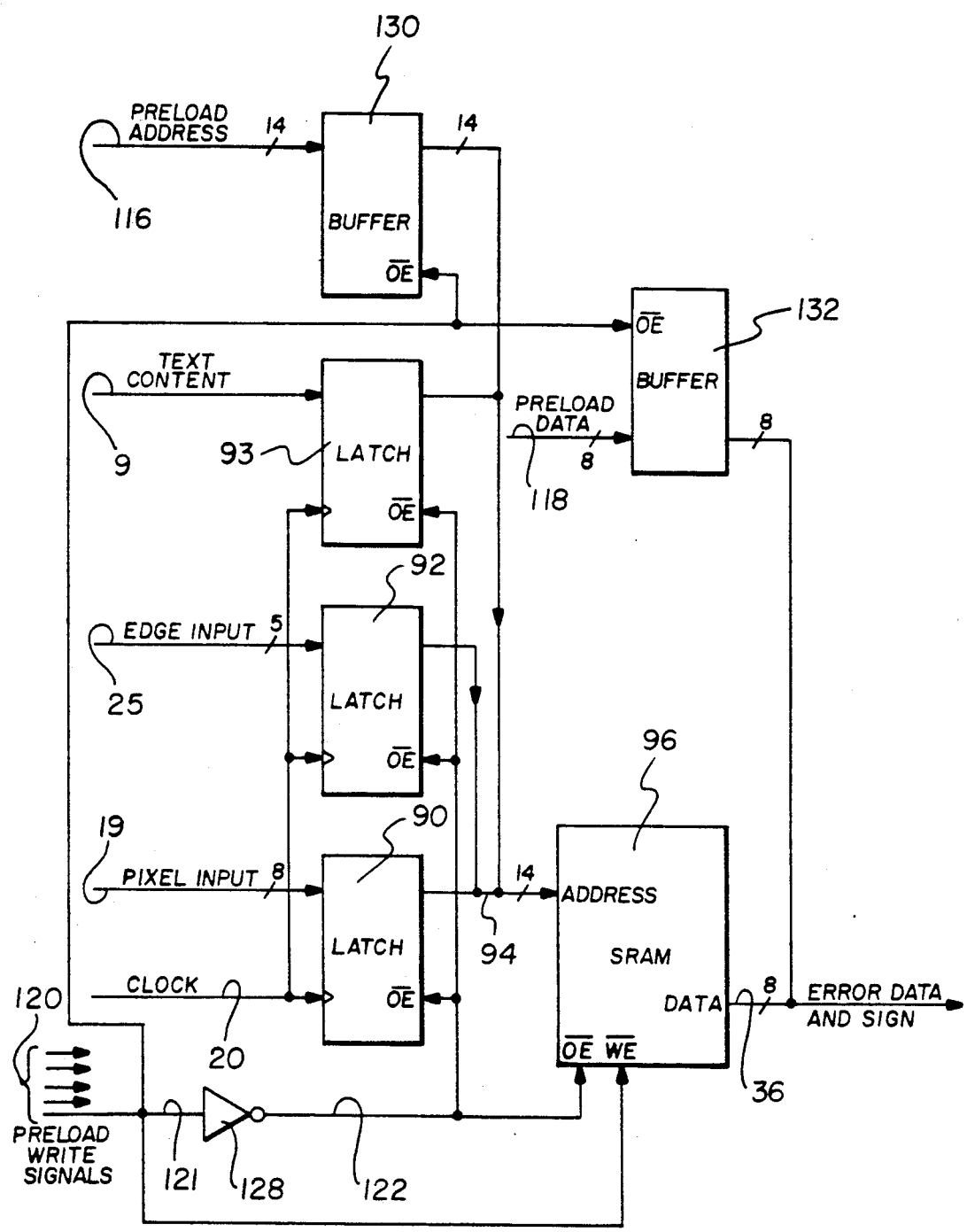
FIG. 6 shows in greater detail the circuitry of the error lookup tables shown in FIG. 1.

Illustrated in FIG. 6 in greater detail is error lookup table 24 shown in FIG. 1. Pixel data in the form of 8 bit data is inputted on line 19 to latch 90, where the data is stored on the leading edge of the input clock signal appearing on line 20. Edge signal data in the form of the five most significant bits of subtracter circuit 88 are input to latch 92 on line 25. The edge data on line 25 is stored in latch 92 on the leading edge of the input clock signal on line 20. The text content signal on line 9 is inputted to latch 93 and stored on the leading edge of the clock signal on line 20. The combination of the 8 bit pixel data, the 5 bit edge data, and the text content signal stored in latches 90, 92, and 93 respectively, form a 14 bit input address on line 94 connected to Static Random Access Memory (SRAM) 96, which contains at the address the appropriate 8 bit error data which is then output on line 36. This 8 bit error data contains a sign bit.

SRAM 96 contains error signal data that has been preloaded by CPU 112 in FIG. 1. CPU 112 places a 14 bit address on preload address line 116, followed by the desired 8 bit error data on preload data on line 118. The signal on line 121 is one of five preload write signals from line 120 in FIG. 1. The active low preload write signal on line 121 is inverted by inverter 128 and routed to the active low output enable controls of latches 90, 92 and 93 on line 122. During the active low period of the preload write signal on line 121 the outputs of latches 90, 92 and 93 are disabled, the preload address on line 116 is driven by buffer 130 into SRAM 96, and the preload data is driven by buffer 132 into SRAM 96. At the end of the active low write signal the data on line 36 is latched into SRAM 96 via the write enable (WE) pin. When the write signal on line 121 goes high, the output of inverter 128 becomes low on line 122, and latches 90, 92, 93 and SRAM 96 resume normal operation by driving lines 94 and 36, respectively. CPU 112 performs one write operation for each location in SRAM 96. Each of the four error lookup tables in FIG. 1 is the same; however, each uses a different preload write signal from line 120, and is preloaded with different data.

The appropriate error data contained in each lookup table SRAM is determined by the incoming pixel value and edge signal value. One example would have pixel value of 210 being outputted by ALU 22, and a pixel value of 210 being outputted by ALU 12. This results in values of 210 on line 19, and 200 on latches 86 and 90. Latch 84 receives the signal on line 11. The result of subtracting 210 from 200 is −10 and appears on line 25. Thus, the inputs to latches 90 and 92 are 250 and −10 respectively. This forms an address to SRAM 96. This address corresponds to a pixel value of 210, and an edge signal of −10. This pixel data was thresholded to form an output of 255. The appropriate total error in this case is (210-255)=−45. In the specific case of generating the error for ALU 22, the total error is weighted by 5/16 according to the "error kernel". Based on an edge signal of −10 one possible selection would be to weight this error by an additional empirically determined factor of ½. The final output on line 36 is thus equal to (−45)·(½)=−7. Once again, actual values using the lookup tables are determined empirically, and must be adjusted by experiment.

Figure 7:
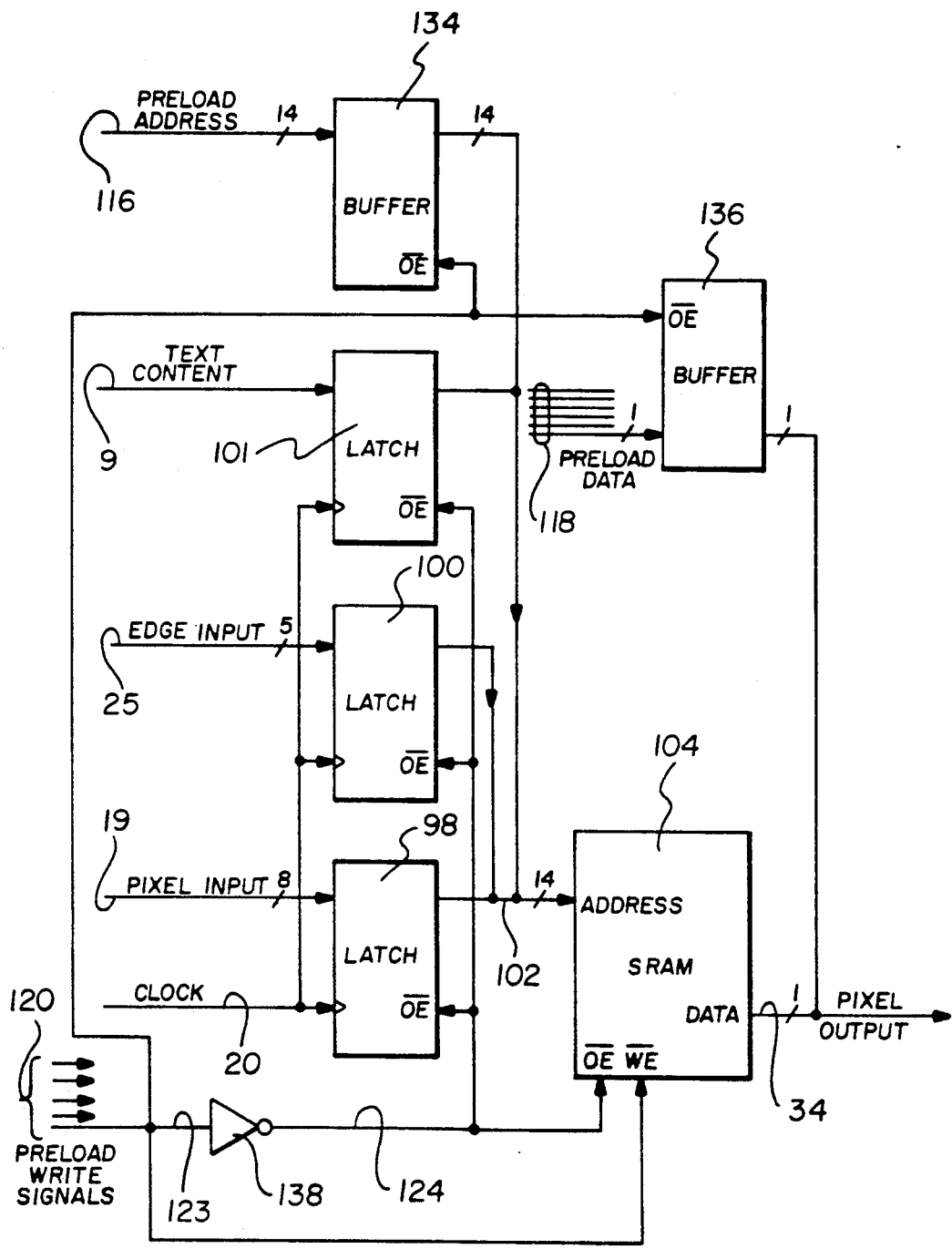
FIG. 7 shows in greater detail the circuitry of the output pixel lookup table shown in FIG. 1.

The output lookup table shown in FIG. 7, is very similar in operation to the error lookup table shown in FIG. 6. Pixel input data in the form of 8 bit data enters on line 19 and is stored in latch 98 on the leading edge of the clock signal appearing on line 20. The 5 bit edge signal appearing on line 25 is stored in latch 100 on the leading edge of the clock signal on line 20. The text content signal on line 9 is inputted to latch 101 and stored on the leading edge of the clock signal on line 20. The combination of the 8 bit pixel data, the 5 bit edge data, and the text content signal stored in latches 98, 100 and 101 respectively, form a 14 bit input address on line 102 connected to SRAM 104.

SRAM 104 contains output pixel data that has been preloaded by CPU 112 in FIG. 1. CPU 112 places a 14 bit address on preload address line 115, followed by the desired 1 bit output pixel data on the least significant bit of preload data line 118. This is followed by an active low preload write signal on line 123. The signal on line 123 is one of five preload write signals from line 120 in FIG. 1. The active low preload write signal on line 123 is inverted by inverter 138 and routed to the active low output enable controls of latches 98, 100, 101 and SRAM 104 on line 124. During the active low period of the preload write signal on line 123, the outputs of latches 98, 100, 102 and SRAM 104 are disabled, the preload address on line 116 is driven by buffer 134 into SRAM 104, and the preload data is driven by buffer 136 into SRAM 104. At the end of the active low write signal the data on line 34 is latched into SRAM 104 via the write enable (WE) pin. When the write signal on line 123 goes high, the output of inverter 138 becomes low on 124 and latches 98, 100, 102 and SRAM 104 resume normal operation by driving lines 102 and 34, respectively. CPU 112 performs one write operation for each location in SRAM 104.

Such arrangement would have the advantage that the contents of the SRAM's could be easily changed to accommodate a wider variety of image types. Thus, each type of image could use SRAM's that contain lookup table data appropriate for processing that particular type of image.

ADVANTAGES AND INDUSTRIAL APPLICABILITY

Use of the present invention offers advantages in the area of digital enhancement where bilevel devices are used to output computer generated graphics, for example. One field of applicability would be in the scanning and conversion of document or microfilm images into bilevel images to be stored in digital form.

What is claimed is:

1. Apparatus for performing error diffusion thresholding of multiple level digital images into bilevel digital images using image edge information to select from several different lookup tables to perform the calculation of an error signal to be diffused, said apparatus comprising:
    means for scanning a grayscale image and producing data output representative of the density levels of individual pixels comprising that image;
    means for defining a matrix of pixels;
    means for delaying input pixel data by a predetermined number of scan lines;
    means for detecting that portion of the image being scanned to determine if said input pixel data is text or continuous tone data and generate a signal accordingly;
    means for generating multiple error values from first and second sets of error values resulting from first and second predefined error functions when said multiple error values contain either positive or negative signs;
    means for selecting in response to said generated signal either said first or second sets of error values from a preselected set of values containing either positive or negative sign information;
    means for generating a signal representing the edge information at the present scan location in the image;
    means for selecting one of said multiple error values in said selected set based on said edge signals;
    means for adding or subtracting said selected error values based on said edge signal;
    means for adding or subtracting said selected error value from said predetermined number of delayed pixel values; and means for generating an output value.

2. The apparatus in claim 1 wherein said adding and subtracting means further installs means for checking to insure that the calculated value is within a predetermined range.

3. The apparatus in claim 1 wherein said first and second sets of error values resulting from first and second predefined error functions are loaded into said lookup tables by an external source.

4. The apparatus in claim 1 wherein edge signal generating means is a subtraction circuit.

5. The apparatus in claim 1 wherein edge signal generating means is a programmable read only memory.

6. A method for performing error diffusion thresholding of multiple level digital images into bilevel digital images using image edge information to select from several different lookup tables to perform the calculation of an error signal to be diffused, said method comprising the following steps:

scanning a grayscale image and producing a data output representative of the density levels of individual pixels comprising that image;

delaying the input pixel data by a predetermined number of scan lines;

detecting that portion of the image being scanned to determine if the input pixel is text or continuous tone data and generate a signal corresponding thereto;

generate first and second sets of error values resulting from first and second predefined error functions loaded into said lookup table;

select in response to said generated signal either said first or said second set of error values stored in said lookup tables;

generate a signal representing the edge information at the present scan location in the image;

selecting an error value from said selected set based on said signal representing the edge information;

adding or subtracting said selected error values based on said edge signal;

adding or subtracting said selected error value from the predetermined number of delayed pixel values; and generate an output value.

* * * * *